United States Patent [19]

Schlise

[11] Patent Number: 5,667,699

[45] Date of Patent: Sep. 16, 1997

[54] METHOD AND DEVICE FOR REMOVING WASTE OIL FROM OIL FILTERS

[76] Inventor: Larry Schlise, 986 S. Bank Dr., Rock Hill, S.C. 29732

[21] Appl. No.: 665,227

[22] Filed: Jun. 17, 1996

[51] Int. Cl.$^6$ ............................................. B01D 35/16
[52] U.S. Cl. .................... 210/800; 210/233; 210/248; 210/DIG. 17; 184/6.24; 123/196 A; 123/198 DA
[58] Field of Search .................... 210/800, 232, 210/233, 240, 248, DIG. 17; 184/6.24; 123/196 A, 198 R, 198 DA

[56] References Cited

U.S. PATENT DOCUMENTS

| | | |
|---|---|---|
| 4,865,156 | 9/1989 | Poling . |
| 4,967,776 | 11/1990 | Folmar . |
| 4,997,554 | 3/1991 | Frostick . |
| 5,039,403 | 8/1991 | Frostick . |
| 5,114,573 | 5/1992 | Frostick . |
| 5,214,830 | 6/1993 | Rozycki . |
| 5,249,608 | 10/1993 | Hua . |
| 5,390,823 | 2/1995 | Kilgore . |

*Primary Examiner*—Robert Popovics
*Attorney, Agent, or Firm*—Shefte, Pinckney & Sawyer

[57] ABSTRACT

A method and device for removing waste oil from a cartridge-type oil filter with the filter including a plurality of openings formed therein in a predetermined pattern and an oil retention gasket disposed within the filter. The device includes an elongate body portion formed of resilient, bendable material defining a longitudinally extending central body formed with a predetermined lengthwise dimension sufficient to span a distance between two of the openings and two end portions formed integrally with the central body and projecting oppositely outwardly therefrom with the end portions being sized to fit within the openings and being of a sufficient lengthwise dimension to engage and displace at least a portion of the gasket to allow waste oil to be poured or otherwise drained from the filter cartridge. The method includes providing such a device, inserting the end portions into openings in the filter, pressing the end portions inwardly to displace at least a portion of the gasket, and pouring or otherwise draining waste oil from the filter.

10 Claims, 3 Drawing Sheets

METHOD AND DEVICE FOR REMOVING WASTE OIL FROM OIL FILTERS

BACKGROUND OF THE INVENTION

The present invention relates broadly to oil filters and devices used when changing vehicular oil and, more particularly, to a method and device for removing waste oil from cartridge-type oil filters immediately upon removal from the vehicle.

Cartridge-type oil filters are widely used in a variety of vehicles, ranging from automobiles to tractors. Typically, the filter will be formed as a squat, cylindrical metal receptacle with filter media disposed therein and having a rounded bottom and a cap for insertion thereonto during manufacture. A threaded pipe projects downwardly from a mounting bracket on the motor of the vehicle for contract with a mating portion on the oil filter. The oil filters are screwed on using the threaded pipe and are sealed to their mount with a circumferential gasket extending around the cap. With most cartridge-type oil filters, an internal gasket prevents oil from draining from the filter. Commonly, such cartridge-type oil filters may hold approximately one-half quart of oil which, after being circulated through the engine, becomes waste oil.

When oil in such vehicles is changed, the filter is typically inverted and allowed to drain as much as it can and then is discarded. This method leaves a significant quantity of waste oil trapped between the filter media and the outer filter casing due to the internal gasket. Do-it-yourself oil changers simply discard these filters containing waste oil in local landfills. With today's environmental concerns, any collected waste oil is no longer merely discarded but is recycled or disposed of in a predetermined manner defined by a community's environmental standards. Accordingly, the waste oil remaining trapped in a cartridge filter is newly significant. It has become desirable to remove, for collection and recycling, such waste oil from within the cartridge itself. Facilities performing oil changes send used oil filters to recyclers where the trapped oil is collected and recycled. Collecting this oil immediately at the facility would be much more efficient.

Several methods are currently in use to remove waste oil from a cartridge filter. A crude method which can be practiced without special equipment includes driving a screwdriver into the side of the filter and allowing the oil to drain through the resultant hole. This method can be messy, although it is generally successful. A variant on that method is disclosed in Kilgore U.S. Pat. No. 5,390,823. There, an oil filter hand punch provides a needle-like piercing tube for driving into the base of an oil filter and a valve in the handle for draining the oil once the drain tube is in place. This method can also be messy.

A far more complex device is disclosed in Hua U.S. Pat. No. 5,249,608. There, an apparatus is provided with the waste oil receiving pan which is commonly found in gas stations and other lubrication facilities. The Hua '608 device involves a device to force a stream of pressurized air into the filter, thereby driving the oil out. A similarly complex device is disclosed in Rozycki U.S. Pat. No. 5,214,830. According to Rozycki '830, the outer metal casing of the filter is actually severed from the cap which would, again, result in a messy arrangement.

There accordingly exists a need for a simple and effective way to drain the oil from a cartridge-type oil filter without substantial mess and without excessive cost.

SUMMARY OF THE INVENTION

It is accordingly an object of the present invention to provide a simple, yet effective, method and device for draining waste oil from used cartridge-type oil filters immediately upon removal from the vehicle.

To that end, a device for facilitating the removal of waste oil from a cartridge-type oil filter having a plurality of openings formed therein in a predetermined pattern with an oil retention gasket disposed within the cylinder adjacent the openings includes an elongate body portion formed of resilient, bendable material defining a longitudinally extending central body formed with a predetermined lengthwise dimension sufficient to span a distance between two of the openings and two end portions formed integrally with the central body and projecting oppositely outwardly therefrom. The end portions are sized to fit within the openings and are of a sufficient lengthwise dimension to engage and displace at least a portion of the oil retention gasket to allow waste oil to be poured from the filter cartridge.

Preferably, the end portions are tapered inwardly to enhance the ability of the end portions to be fitted in the openings. The taper preferably extends at forty-five degrees from a plane coincident with a side surface of the central body.

According to one preferred embodiment of the present invention, the device is formed with a predetermined lengthwise curvature to enhance the ability of the device to be fitted into the openings. In another preferred embodiment of the present invention, the device is not curved. Preferably, the device is molded from a resilient plastic material.

The present invention also includes the combination of a cartridge-type oil filter having a plurality of openings formed therein in a predetermined pattern with an oil retention gasket disposed within the cylinder adjacent the openings and a device for facilitating the removal of waste oil therefrom, as described above.

According to the method of the present invention, waste oil may be removed from a cartridge-type oil filter using the aforesaid device. The method preferably includes the steps of providing such a device as described above, inserting an end portion into a first opening in the filter, inserting a second end portion into a second opening in the filter, pressing the end portions inwardly to displace at least a portion of the gasket, and pouring waste oil from the filter. The method preferably further includes the step of arranging the filter with the device lodged therein such that the lengthwise dimension of the device is vertically oriented prior to pouring the waste oil.

It is further preferred that the steps of inserting the end portions into openings includes inserting the end portions into oppositely disposed openings. Further, the step of providing the device includes providing a device wherein the end portions are tapered inwardly to enhance the ability of the end portions to be fitted within the openings. Additionally, the step of providing the device includes providing a device wherein the central body is formed with a predetermined lengthwise curvature to enhance the ability of the device to be fitted into the openings.

By the above, the present invention provides a simple and effective solution to the collection and allows for proper and immediate recycling disposal of waste oil otherwise trapped within an oil filter. The device is both compact and inexpensive to produce such that a specimen of the device may be packaged with each oil filter sold, thereby enhancing the oil filter manufacturer's ability to meet the public need to conform with environmental regulations.

DETAILED DESCRIPTION OF THE PREFERRED EMBODIMENT

Figure 1:
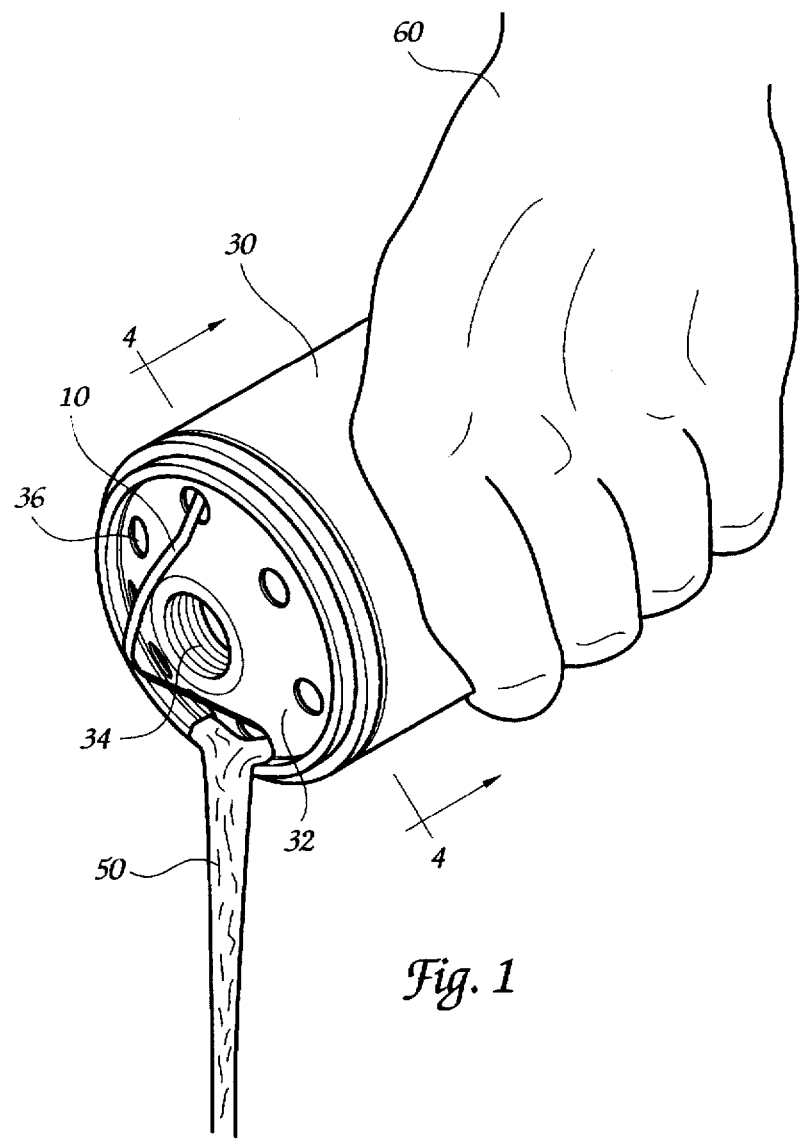
FIG. 1 is a perspective view illustrative of an operative step performed according to the preferred embodiment of the method of the present invention.

Turning now to the drawings and, more particularly, to FIG. 1, a method and device for removal of waste oil from a cartridge-type oil filter is illustrated therein with the device being illustrated generally at 10. The device may be seen more clearly in FIG. 2 and the operative connection between the device 10 and the oil filter 30 is illustrated in FIG. 4.

Figure 4:
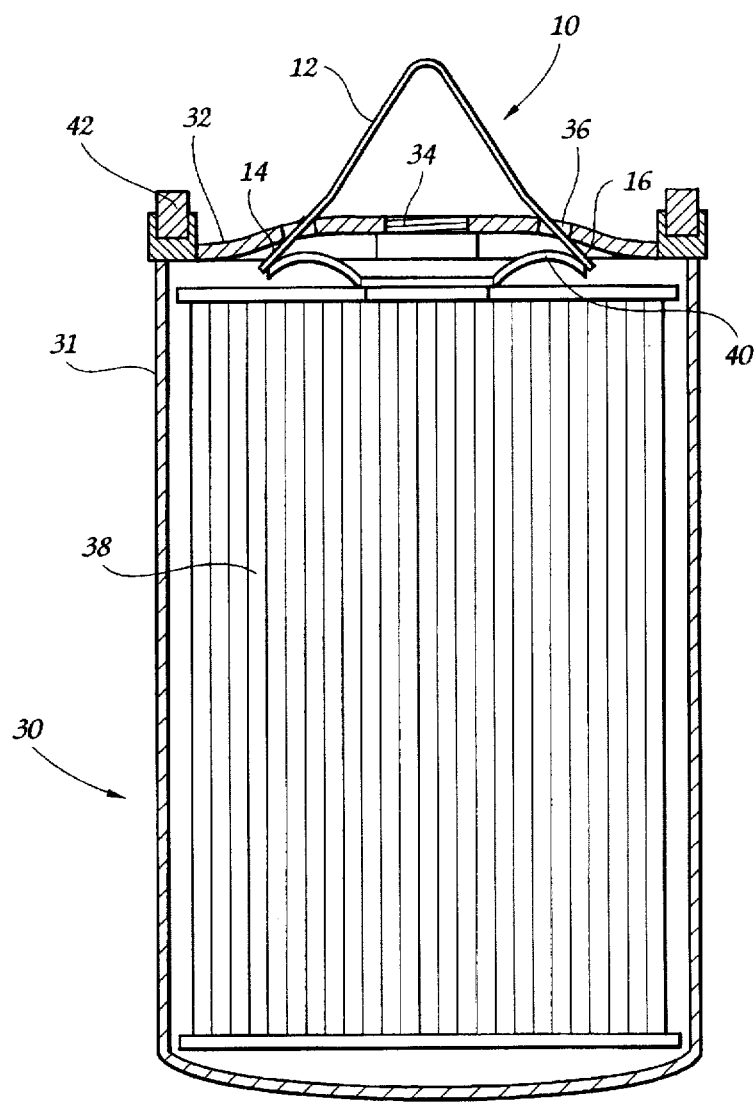
FIG. 4 is a cutaway view of an oil filter having the device fitted therein, with the cutaway being taken along lines 4—4 in FIG. 1.

With continued reference to FIG. 4, a cartridge-type oil filter is illustrated at 30 and includes a generally cylindrical cup-like metal body 31. A cap 32 is fitted to the top portion to retain oil and filter material therein. A pleated filter element 38 is disposed within the cylinder and allows for oil to flow therethrough while trapping contaminants on the surface thereof. The filter element 30 is fitted to an internally threaded outlet pipe 34 which is disposed along a central axis of the filter. An annular gasket 42 is disposed around the cap for sealing the oil filter against its mount on an engine. A plurality of inlet openings 36 are arranged circumferentially about the outlet pipe 34 to allow oil to flow into the filter.

To prevent backflow, an annular gasket 40 is disposed within the filter and is mounted to the base of the outlet pipe 34. The gasket 40 is formed as a partial torus with an inner circumferential surface mounted to the outlet pipe 34 and the outer circumferential surface in contact with the cap 32 adjacent the inlet openings 36. The gasket configuration allows the natural resiliency of the rubber gasket material to bias the gasket 40 into a sealing configuration with the cap 32. Oil under pressure acts to displace the gasket 40 and allow oil flow into the filter. This influent is forced through the filter media 38 and cleaned oil exits the filter through the outlet pipe 34. When the filter 30 is not under pressure, the gasket 40 remains in contact with the cap 32 to seal the inlet openings 36. As can be seen in FIG. 4, proper insertion of the device 10 into the openings 36 allows the end portions 14,16 to displace the gasket 40 sufficiently to allow trapped oil 50 to be poured or drained from the filter.

Figure 2:
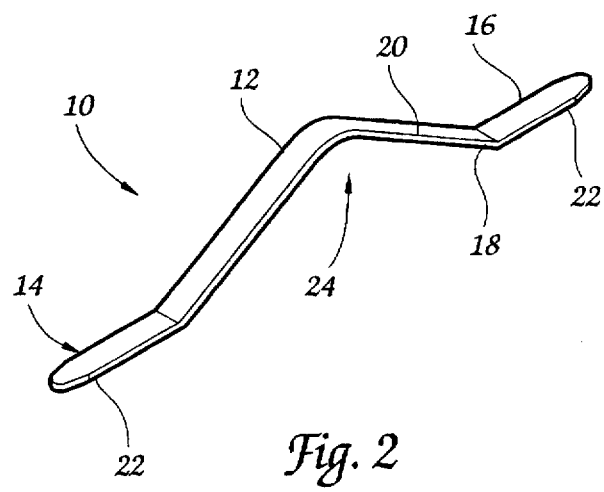
FIG. 2 is a perspective view of a device for facilitating the removal of waste oil from a cartridge-type oil filter according to one preferred embodiment of the present invention.
Figure 3:
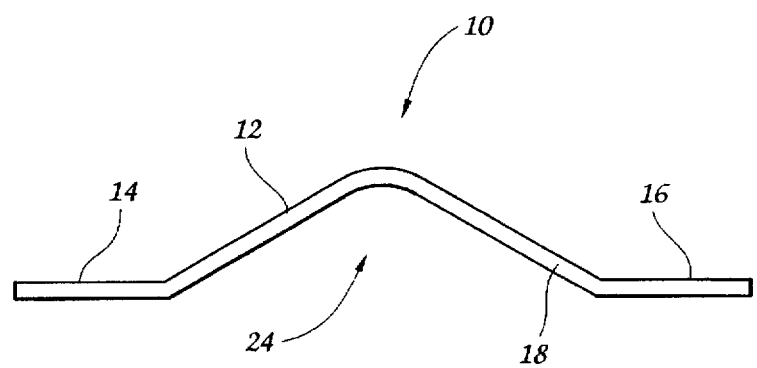
FIG. 3 is a side elevational view of the device illustrated in FIG. 2.

Referring now to FIG. 2, a device for facilitating the removal of waste oil from the cartridge-type oil filter 30 is illustrated generally at 10 and includes an elongate central body 12 having two end portions 14,16 projecting oppositely outwardly therefrom. The device is formed from a resilient material, preferably plastic. The material should be chosen such that the device may readily bend without breaking. The device 10 is formed as a flat member having a thickness defined by a side surface 18 and a width defined by a top surface 20. As seen in FIG. 2, one embodiment of the device is formed with a lengthwise curvature 24 which enhances the ability of the device to be fitted into the openings of the oil filter 30, as will be seen in greater detail hereinafter. Each end portion 14,16 is preferably formed with a tapered portion 22 near its terminus. The tapered portion 22 preferably extends forty-five degrees away from a plane coincident with the side wall 18 of the device 10. The tapered end portions 14,16 enhance the ability of the device to be inserted into openings 36 in the oil filter 30, as will be explained in greater detail hereinafter. FIG. 3 illustrates a side view of the device 10.

Figure 5:
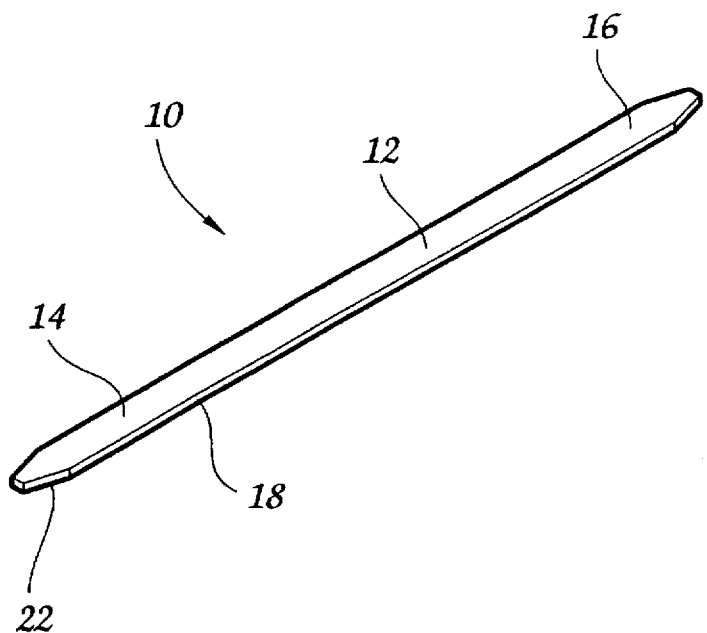
FIG. 5 is a perspective view of a device for facilitating the removal of waste oil from a cartridge-type oil filter according to a second preferred embodiment of the present invention.
Figure 6:
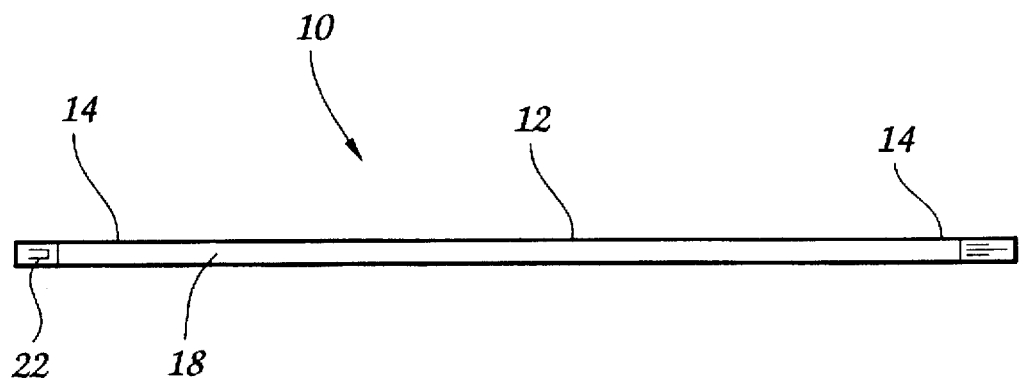
FIG. 6 is a side elevational view of the device illustrated in FIG. 5.

Turning now to FIG. 5, a second preferred embodiment of the present invention is illustrated generally at 10 and is formed substantially similarly to the first preferred embodiment except that the body curvature 24 is not included. Care should be taken when choosing the material for the second portion. Although the second portion is easier to mold, the material choice is more critical because the resiliency of the device must be sufficient to allow greater bending action than with the first preferred embodiment. FIG. 6 illustrates a side view of the second preferred embodiment.

In operation, and according to the method of the present invention, once the oil filter 30 is removed from the vehicle, the device 10 is fitted to the filter 30 with the tapered end portions 14,16 extending inwardly into oppositely disposed openings in the cap 32, as seen in FIG. 1. The device 10 is pressed inwardly until the gasket 40 is sufficiently is displaced from its seat to allow oil to flow thereby. The oil filter is then arranged with the device 10 in vertical alignment such that one opening 36 acts as a vent opening, while the other opening 36 acts as an oil outlet. The person 60 changing the oil performs the alignment and then pours the remaining waste oil 50 from the filter as seen in FIG. 1. Both the device 10 and the filter 30 may then be disposed of in an environmentally conscious manner.

By the above, the present invention provides a simple and effective method and device for removing and collecting waste oil otherwise trapped in a cartridge-type oil filter. Given the number of cartridge-type oil filters in use, the present invention provides a cost-effective method of immediately recovering a significant volume of waste oil.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. In combination, a cartridge-type oil filter having a cylindrical body and a cap with a plurality of openings formed therein in a predetermined pattern, an oil retention gasket disposed within the cylinder adjacent the openings and a device for facilitating the removal of waste oil therefrom, said device comprising an elongate body portion formed of resilient, bendable material defining a central body formed with a predetermined lengthwise dimension sufficient to span a distance between two of the openings and two end portions formed integrally with said central body and projecting oppositely outwardly therefrom, said end portions being sized to fit within the openings and being of a sufficient lengthwise dimension to engage and displace at least a portion of the gasket to allow waste oil to be drained from the filter cartridge.

2. The combination according to claim 1, wherein said end portions are tapered inwardly to enhance the ability of the end portions to be fitted into said openings.

3. The combination according to claim 2, wherein said taper extends at forty-five degrees from a plane coincident with a side surface of the central body.

4. The combination according to claim 1, wherein said central body is formed with a predetermined lengthwise curvature to enhance the ability of the device to be fitted into said openings.

5. The combination according to claim 1, wherein said device is molded from a resilient plastic material.

6. A method for removing waste oil from a cartridge-type oil filter having a cylindrical body and a cap with a plurality of openings formed therein in a predetermined pattern, an oil retention gasket disposed within the cylinder adjacent the openings, said method comprising the steps of:

provlding a device for facilitating the removal of waste oil from the filter having an elongate central body formed of resilient, bendable material defining a central body formed with a predetermined lengthwise dimension sufficient to span a distance between two of the openings and two end portions formed integrally with said central body and projecting oppositely outwardly therefrom, said end portions being sized to fit within the openings and being of a sufficient lengthwise dimension to engage and displace at least a portion of the gasket to allow waste oil to be drained from the filter cartridge;

inserting an end portion into a first opening in the filter;

inserting a second end portion into a second opening in the filter;

pressing the end portions inwardly to displace at least a portion of the gasket; and draining the waste oil from the filter.

7. A method for removing waste oil from a cartridge-type oil filter according to claim 6 and further comprising the step of arranging the filter with the device lodged therein such that the lengthwise dimension of the device is vertically oriented prior to draining the waste oil.

8. A method for removing waste oil from a cartridge-type oil filter according to claim 6, wherein the steps of inserting the end portions into openings includes inserting said end portions into oppositely disposed openings.

9. A method for removing waste oil from a cartridge-type oil filter according to claim 6, wherein the step of providing said device includes providing a device wherein said end portions are tapered inwardly to enhance the ability of the end portions to be fitted into the openings.

10. A method for removing waste oil from a cartridge-type oil filter according to claim 6, wherein the step of providing said device includes providing a device wherein said central body is formed with a predetermined lengthwise curvature to enhance the ability of the device to be fitted into the openings.

* * * * *